June 4, 1968  E. C. MACHOWSKI  3,386,417
SANITARY STATION FOR PET ANIMALS
Filed Aug. 19, 1966

INVENTOR.
Eugene C. Machowski 3,386,417
SANITARY STATION FOR PET ANIMALS
Eugene C. Machowski, 7728 Holmes St.,
Kansas City, Mo. 64131
Filed Aug. 19, 1966, Ser. No. 573,566
6 Claims. (Cl. 119—1)

This invention relates to sanitary enclosures, and more particularly a sanitary station for pet animals, which is liquid proof and affords additional protection for the floor, rugs, furniture, etc.

Another object of this invention is to provide a sanitary station for pet animals which is provided with removable absorbent material saturated with deodorizing substance.

Another object of this invention is to provide a sanitary station for pet animals wherein the edge portions of said station form an inwardly inclined slope so that the liquids are directed into the deodorized absorbent material.

Still another object of this invention is to provide a sanitary station for pet animals which is made of flexible plastic material, may be mass-produced, may be moderately priced, and provides maximum utility to the owner of pet animals.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
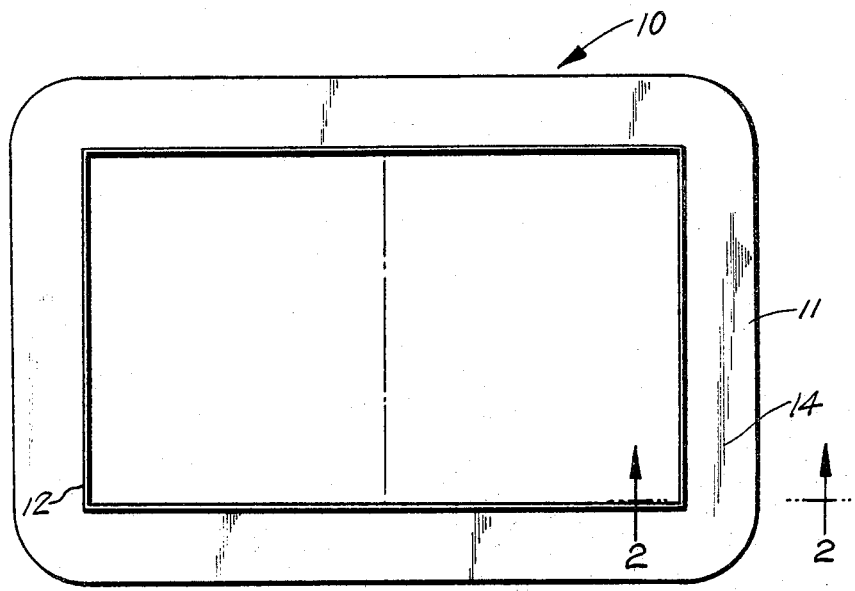
Figure 2:
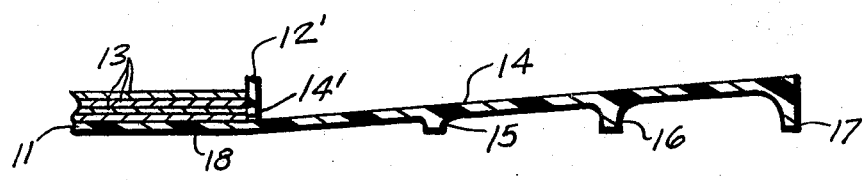
Figure 3:
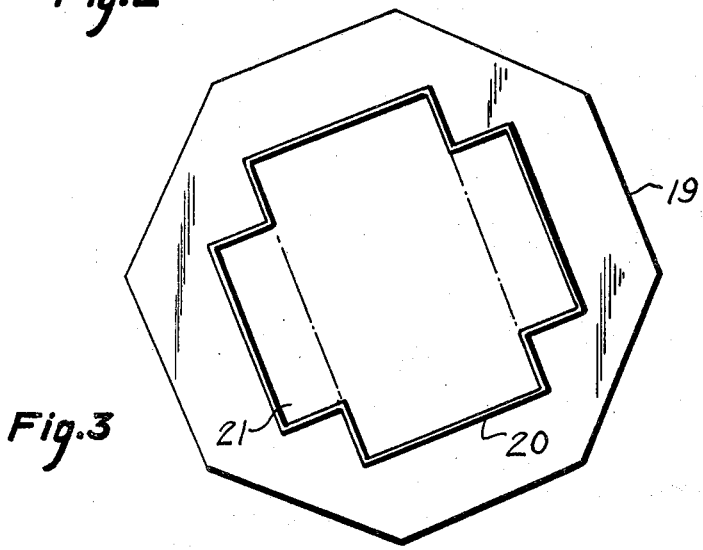

In the drawing:
FIGURE 1 is a top plane view of this invention.
FIGURE 2 is an enlarged cross-sectional view taken along the lines 2—2 of FIGURE 1.
FIGURE 3 is a top plane view showing a modified form of this invention.

According to this invention, a sanitary station for pet animals 10 is provided with a washable, generally rectangular plastic member 11. A substantially rectangular enclosure 12 which includes upwardly extending walls or ribs 12' forms the working area of this invention.

A plurality of layers of absorbent material 13, such as, newspapers, paper towels, etc., may be suitably positioned within the rectangular enclosure 12 for providing cushion means to the pet animals. If desired, sanitizing substances, such as, deodorant or liquid soap may be sprinkled over the absorbent matter 13 to eliminate various odors.

As it may be seen from FIGURE 2, the edge portions 14 of the station member 11 assume inwardly inclined slopes being supported by legs or rib members 15, 16 and 17 of various lengths, the outer member 17 being the longest. Each slope of each edge portion 14 is of uniform angular elevation to assure the penetration of liquids through holes 14' into the rectangular enclosure 12.

It will also be noted that, in operation, the absorbent matter 13 may be conveniently removed from enclosure 12 and, since the station member 11 is made of flexible plastic material, may be washed and re-used numerous times.

In its modified form, the invention provides for a octagon-shaped plate member which, like in the preferred embodiment, is of flexible plastic material and its main portion being provided with a symmetrical oriented cruciform enclosure 20. Like in the preferred embodiment, enclosure 20 is adapted to receive absorbent matter 21.

While this invention has been described with particular reference to the illustrated embodiments, it will be understood to those skilled in the art that a number of changes and modifications may be executed without deviating from the spirit and scope of this invention. It will also be understood that the above description and drawings should be taken as the exemplary descriptions rather than a limiting factor.

What I now claim is:
1. A sanitary station for pet animals comprising, in combination, a rectangular plate-like station member, a means defining a rectangular enclosure within the main portion of said station member and spaced from the edge thereof, layers of liquid absorbing litter material within said enclosure, the edge portions of said station member assume inwardly inclining, angular configurations for directing the liquid from said edge portions into said enclosure, said enclosure being provided with a plurality of horizontally disposed holes adjacent the top surface of said station member for admitting said liquid therein, and leg members for supporting said edge portions and spacing them from the flat surface.

2. The combination according to claim 1, wherein said station member is made of washable, plastic material.

3. The combination according to claim 1, wherein said enclosure includes an upwardly disposed wall which assumes a rectangular configuration and is provided with a plurality of transversely positioned holes.

4. The combination according to claim 1, wherein said leg members are equally spaced from each other and are adapted to support said edge portion in a gradually inclining manner.

5. The combination according to claim 1, wherein said layers of said absorbing material are provided with deodorizing substances for eliminating the waste odors of the pet animals.

6. The combination according to claim 1, wherein the shape of the station member is octagonal and the shape of the enclosure is cruciform.

References Cited

UNITED STATES PATENTS

| 1,773,141 | 8/1930 | Hodgson | 119—1 |
| 2,306,014 | 12/1942 | Carson | 119—1 |
| 2,738,915 | 3/1956 | Clair | 229—2.5 |
| 2,813,509 | 11/1957 | Bruno | 119—51 |
| 3,276,427 | 10/1966 | Edwards | 119—1 |
| 3,284,273 | 11/1966 | Prentice | 119—1 X |

FOREIGN PATENTS 140,241  1/1935  Austria.

ALDRICH F. MEDBERY, *Primary Examiner.*